(12) United States Patent
Lukács

(10) Patent No.: US 12,139,148 B2
(45) Date of Patent: Nov. 12, 2024

(54) METHOD FOR ITERATIVELY DETERMINING THE RADIUS OF A MOTOR VEHICLE WHEEL

(71) Applicants: thyssenkrupp Presta AG, Eschen (LI); thyssenkrupp AG, Essen (DE)

(72) Inventor: Loránd Lukács, Budapest (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 290 days.

(21) Appl. No.: 17/763,844

(22) PCT Filed: Sep. 18, 2020

(86) PCT No.: PCT/EP2020/076068
§ 371 (c)(1),
(2) Date: Mar. 25, 2022

(87) PCT Pub. No.: WO2021/058382
PCT Pub. Date: Apr. 1, 2021

(65) Prior Publication Data
US 2022/0289206 A1 Sep. 15, 2022

(30) Foreign Application Priority Data
Sep. 27, 2019 (DE) ...................... 10 2019 214 815.8

(51) Int. Cl.
*B60W 40/12* (2012.01)
*B60C 23/06* (2006.01)
(Continued)

(52) U.S. Cl.
CPC ........... *B60W 40/12* (2013.01); *B60C 23/061* (2013.01); *G01B 21/12* (2013.01); *G01M 17/013* (2013.01); *B60W 2040/1384* (2013.01)

(58) Field of Classification Search
CPC ......... B60W 40/12; B60W 2040/1384; B60W 2520/10; B60W 2520/26; B60W 2520/28;
(Continued)

(56) References Cited

U.S. PATENT DOCUMENTS

| 6,644,105 B2 | 11/2003 | Dieckmann et al. |
| 8,326,480 B2 | 12/2012 | Köbe et al. |

(Continued)

FOREIGN PATENT DOCUMENTS

| CN | 105829185 A | 8/2016 |
| CN | 107415955 A | 12/2017 |

(Continued)

OTHER PUBLICATIONS

English Translation of International Search Report Issued in PCT/EP2020/076068 dated Oct. 26, 2020.

*Primary Examiner* — Rodney A Butler
(74) *Attorney, Agent, or Firm* — thyssenkrupp North America, LLC

(57) ABSTRACT

A method comprises checking whether a motor vehicle is driving based on the incremental sensor units, checking whether the motor vehicle is driving in a straight line based on a driving direction sensor unit, checking whether each wheel is slide-free and slip-free based on the incremental sensor units, determining the distance driven by each wheel based on the sensor value of the respective incremental sensor unit and the radius to be iteratively determined of the wheel of a previous iteration, determining the distance driven by the motor vehicle based on the distance driven by each wheel, determining the radius to be iteratively determined of the wheel based on the distance traveled by the motor vehicle and the sensor value of the respective incremental sensor unit, verifying that a validation condition is met and then repeating the aforementioned steps.

9 Claims, 2 Drawing Sheets

(51) Int. Cl.
*G01B 21/12* (2006.01)
*G01M 17/013* (2006.01)
*B60W 40/13* (2012.01)

(58) Field of Classification Search
CPC .......... B60W 2540/18; B60W 2556/10; B60C 23/061; G01B 21/12; G01M 17/013; G01M 17/007; G01M 17/02; B60T 2240/07
See application file for complete search history.

(56) References Cited

U.S. PATENT DOCUMENTS

| | | | |
|---|---|---|---|
| 9,821,815 | B2 | 11/2017 | Duvernier |
| 2001/0054310 | A1* | 12/2001 | Dieckmann ........... B60C 23/061 73/146 |
| 2002/0095253 | A1 | 7/2002 | Losey et al. |
| 2007/0283750 | A1 | 12/2007 | Griesser et al. |
| 2010/0179718 | A1 | 7/2010 | Kobe et al. |
| 2017/0015153 | A1 | 1/2017 | Shin et al. |

FOREIGN PATENT DOCUMENTS

| | | |
|---|---|---|
| CN | 107640151 A | 1/2018 |
| DE | 196 25 544 C1 | 8/1997 |
| DE | 10 2007 029 870 A1 | 1/2009 |
| DE | 10 2010 000 867 A1 | 7/2011 |
| DE | 10 2011 118 436 A1 | 5/2013 |
| DE | 10 2012 000 213 A1 | 7/2013 |
| DE | 10 2016 103 637 A1 | 9/2016 |
| DE | 10 2016 112 805 A1 | 1/2017 |
| EP | 1 155 879 A2 | 11/2001 |
| EP | 2 818 340 A1 | 12/2014 |
| FR | 2 785 574 A1 | 5/2000 |
| JP | 2004078386 A | 3/2004 |
| JP | 2008241462 A | 10/2008 |
| WO | 2014146821 A1 | 9/2014 |
| WO | 2005/097525 A1 | 10/2015 |

* cited by examiner

METHOD FOR ITERATIVELY DETERMINING THE RADIUS OF A MOTOR VEHICLE WHEEL

CROSS REFERENCE TO RELATED APPLICATIONS

This application is a U.S. National Stage Entry of International Patent Application Serial Number PCT/EP2020/076068, filed Sep. 18, 2020, which claims priority to German Patent Application No. DE 10 2019 214 815.8, filed Sep. 27, 2019, the entire contents of both of which are incorporated herein by reference.

FIELD

The present disclosure generally relates to methods for iteratively determining the radius of a wheel from a number of wheels of a motor vehicle.

BACKGROUND

In the field of the autonomous driving of motor vehicles, it is important to know the current radii of the individual wheels of a motor vehicle while travelling. This is because, depending on the specific question or objective, the individual radii can be used as an input variable for a calculation, for example to carry out estimates regarding the position and/or orientation of the motor vehicle. Such position and/or orientation estimates are carried out in particular during the automated parking and unparking of a self-driving or partially self-driving passenger car.

In order to determine the radii of the individual wheels of a motor vehicle, methods based on a kinematic or dynamic model are known from the prior art. However, these methods are complex and computationally intensive and runtime intensive.

From US 2002/0095253 A1, a method is known for calculating the radius of a wheel tire as a function of the air pressure of the tire of a wheel and the temperature of the tire of a wheel.

Furthermore, methods for detecting pressure loss in a tire of a wheel are known from WO 2005/097525 A1, EP 2 818 340 A1 and DE 10 2007 029 870 A1. However, these methods require additional sensors, which result in additional costs, or are comparatively complex and computationally intensive and runtime intensive.

Thus a need exists for a comparatively simple method for determining a wheel radius, which makes the sensor values of sensor units usable which are typically present or installed in today's motor vehicles, so that no additional sensors are required.

DETAILED DESCRIPTION

Figure 1:
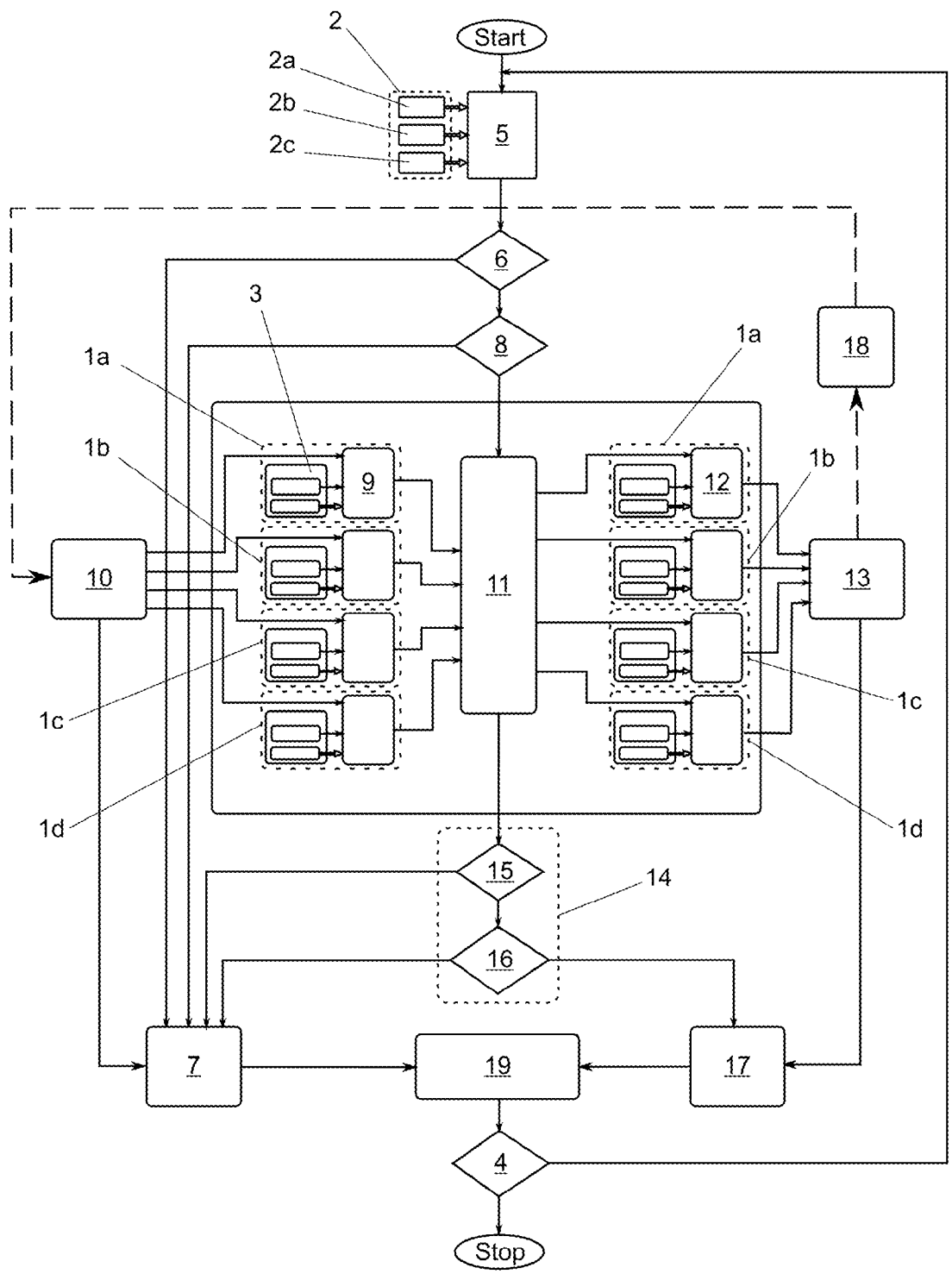
FIG. 1 is a flowchart of an example method for determining a radius of a motor vehicle wheel.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for iteratively determining the radius of a wheel from a number of wheels of a motor vehicle. In some examples, the motor vehicle may have at least one driving direction sensor unit for detecting straight line travel, and each wheel of the number of wheels may be assigned at least one incremental sensor unit for detecting increments embodying wheel rotational movements.

A method is proposed for iteratively determining the radius of a wheel of a number of wheels of a motor vehicle, wherein the motor vehicle has at least one driving direction sensor unit for detecting straight line travel, wherein each wheel of the number of wheels is assigned at least one incremental sensor unit for detecting increments embodying wheel rotational movements.

It is an iterative method, which means that the method usually goes through multiple iterations or repetitions. Results of previous iterations or repetitions serve as a basis of calculation for subsequent iterations or repetitions. The method runs through at least one iteration or repetition, namely the first iteration or repetition. An iteration or repetition of the method includes the following steps:

First, it is checked whether the motor vehicle is driving, based on sensor values of at least one of the at least one incremental sensor unit. In this way, the basic requirement for the applicability of the method according to the invention is ensured, namely the driving movement of the motor vehicle.

If a driving movement has been successfully checked or detected, it is then checked whether the motor vehicle is driving in a straight line, based on sensor values of the at least one driving direction sensor unit. Straight line travel is characterized by the fact that all wheels of the motor vehicle are oriented parallel to each other. The checking or detection of straight line travel makes it possible to prevent wheel radii determined while driving in a curve from being put to further use. This is important for the quality or reliability or significance of the determined radii, since the radii determined during a curve do not correspond to the actual radii, since the outer wheels turn faster in a curve than the inner wheels in a curve.

If straight line travel has been successfully checked or detected, it is then checked whether each wheel of the number of wheels is slide-free and slip-free, based on sensor values of at least one of the at least one incremental sensor unit. The checking or detection of slide-free and slip-free straight line travel makes it possible to prevent radii determined in sliding and slipping conditions from being put to further use. This also serves to ensure the quality or reliability or significance of the determined radii, since radii determined during sliding and slipping states do not correspond to the actual radii. This is due to the fact that sliding and slipping wheels turn slower or faster than slide-free and slip-free wheels. Therefore, the distance travelled by a single sliding and slipping wheel does not correspond to the distance travelled by a single slide-free and slip-free wheel. Such a measurement would therefore not be valid and should be discarded and not put to further use.

If slide-free and slip-free straight line travel of the motor vehicle has been successfully checked or detected, the distance driven by each wheel of the number of wheels is determined, namely based on the sensor value of the respective incremental sensor unit and the iterative radius of the wheel of one of the previous iterations. In the case of the first iteration of the method, the radius to be determined iteratively of the wheel of one of the previous iterations corresponds to an initially defined value that serves as the starting value. This starting radius value can be determined on the basis of the wheel dimensions specified by the manufacturer.

Subsequently, the distance driven by the motor vehicle is determined based on the distance driven by each wheel of the number of wheels.

Subsequently, the radius to be determined iteratively of the wheel is determined based on the distance travelled by the motor vehicle and the sensor value of the respective incremental sensor unit.

It is then checked whether a validation condition is met. The validation condition is to be established before the method is carried out. The validation condition may be carried out in terms of time or the procedure before, during or after the determination of the radius to be determined iteratively.

With the help of the validation condition, it is checked whether the determined radii are sufficiently reliable, i.e. whether the determined radii can be "trusted". In other words, if the validation condition is met, then the radii determined can be assumed to be sufficiently accurate as the actual radii. Thus, by defining the validation condition, a quality measure can be defined with regard to the determined radius values.

If the validation condition is met, the aforementioned steps are repeated.

The method according to the invention is an iterative method, that is a repetitive method based on previously determined results of the wheel radii. At least one iteration or repetition of the method is carried out, wherein each iteration or repetition basically includes all of the aforementioned steps, unless individual prerequisites are checked negatively. As a rule, multiple method iterations are carried out, namely method iterations are carried out as long as a driving movement of the motor vehicle is detected.

The radius of a single wheel is referred to in the context of the present invention as an individual radius. The radius of a single wheel determined by calculations within a single iteration or repetition of the method, that is the intermediate calculation result of a single iteration or repetition, is called an a posteriori individual radius in the context of the present invention. The radius of a single wheel which serves as the input value for the calculations within a single iteration or repetition of the method is called the a priori individual radius.

The driving direction sensor unit of the motor vehicle may have an inertial sensor for detecting inertial forces. Inertial sensors include accelerometers and yaw rate sensors. In addition or alternatively, the driving direction sensor unit may have a yaw rate sensor for detecting the yaw rate or the yaw angle around the yaw axis of the motor vehicle. The yaw axis is the vertical axis of the coordinate system which is fixed relative to the vehicle. In addition or alternatively, the driving direction sensor unit may have a steering angle sensor. The steering angle sensor or steering wheel angle sensor detects the steering angle of the steering wheel. Multiple sensors within the driving direction sensor unit each form redundancies. This increases the reliability of the driving direction sensor unit. If the sensors are also based on different measuring principles, this improves the quality or reliability of the driving direction sensor unit.

The incremental sensor unit includes an incremental sensor, also known as an incremental encoder, for detecting wheel rotational movements or wheel rolling movements or increments embodying wheel angle changes. The incremental sensor units can each be in the form of an ABS sensor—a sensor of an anti-lock braking system—or as an ESP sensor—a sensor of an electronic stability system—which are regularly present or installed in today's motor vehicles anyway. This has the advantage that no additional sensors are required. As a result, there are no additional costs, so that the implementation of the method according to the invention is cost-efficient. The increments are repetitive, periodic sections which are uniformly distributed over the entire circumference of a preferably circular disk. During the wheel rotation or wheel rolling movement, a counting unit counts the increments moving past it. The counting unit may have a sliding contact or be non-contact, for example optical, magnetic, inductive or the like. The number of detected increments can be converted to a change in angle. Finally, the change in angle is related to a reference value which embodies a known angular position. The incremental sensor unit is thus based on a relative measuring principle.

In an advantageous manner, a driving movement is detected or successfully checked, namely in the form of a numerical value comparison, if between two consecutive time steps, in particular two successive time steps within a definable period of time, preferably two immediately consecutive time steps, the sensor value of one or all incremental sensor units changes by or by more than a corresponding, definable threshold value. This threshold value must be set before commissioning and can be entered as a changeable setting of a control unit or as a non-changeable or hard-coded setting of the control unit.

In a further advantageous manner, straight line travel is detected or successfully checked, namely in the form of a numerical value comparison, if between two consecutive time steps, in particular two successive time steps within a definable period of time, preferably two immediately consecutive time steps, the sensor value of at least one driving direction sensor unit changes by less than or by up to a corresponding, definable threshold value. In other words, traversing a bend is detected when the sensor value of at least one driving direction sensor unit changes by more than this threshold between two consecutive time steps. This threshold value must be set before commissioning and can be entered as a changeable setting of a control unit or as a non-changeable or hard-coded setting of the control unit.

In an even more advantageous manner, slide-free and slip-free straight line travel is detected or successfully checked, namely in the form of a numerical value comparison, if the sensor values of at least two of the incremental sensor units deviate from each other by less than or by up to a corresponding, definable threshold value. In other words, a sliding and slipping state is detected when the sensor values of at least two of the incremental sensor units differ by more than this threshold value. This threshold value must be set before commissioning and can be entered as a changeable setting of a control unit or as a non-changeable or hard-coded setting of the control unit.

Preferably, the distance driven by the wheel is determined by multiplying the sensor value of the respective incremental sensor unit by the resolution of the respective incremental sensor unit and by the radius to be determined iteratively of the wheel. This is a comparatively less complex and therefore less computationally intensive and runtime intensive determination.

More preferably, the distance travelled by the motor vehicle is determined by calculating an average value, in particular an arithmetic, geometric or quadratic mean, of the distance travelled by all wheels.

Even more preferably, the radius to be determined iteratively of the wheel is determined by dividing the distance driven by the motor vehicle by the sensor value of the respective incremental sensor unit and by the resolution of the respective incremental sensor unit.

Even more preferably, the validation condition includes one or more validation criteria, wherein the validation condition is met if all validation criteria are met.

A validation criterion is advantageously met if a definable relaxation length has been achieved, wherein the relaxation length can be defined as an accumulated distance driven, in particular the distance driven before the lateral guiding force reaches about 63% of its stationary value when the wheel is traversing a curve, or the distance driven which corresponds approximately to the value of a radius.

In addition or alternatively, a validation criterion is advantageously met if a definable driven distance of the wheel or a definable driven distance of the motor vehicle or a definable number of recorded increments of at least one of the at least one incremental sensor unit has been achieved.

DESCRIPTION OF THE DRAWING

In the different figures, the same parts are always provided with the same reference characters and are therefore usually only named or mentioned once.

FIG. 1 shows an embodiment of the method according to the invention in a representation as a flowchart.

The method of the present embodiment is used for iterative determination of the respective values of the radii of four wheels 1a, 1b, 1c and 1d of a motor vehicle which is not shown in the figures.

The motor vehicle has a driving direction sensor unit 2 for detecting straight line travel. The driving direction sensor unit 2 is able to distinguish whether the vehicle is driving in a straight line or in a curve. The driving direction sensor unit 2 has an inertial sensor 2a, a yaw rate sensor 2b and a steering angle sensor 2c. The three sensors 2a, 2b and 2c each form redundancies and are also based on different measuring principles. This increases the reliability of the driving direction sensor unit 2 and improves its quality and reliability.

After the method has been started—cf. "START" of the method—the sensor values of the incremental sensor units 3 assigned to the respective wheel 1 are checked in a first step with regard to the detection of a driving movement of the motor vehicle, wherein the incremental sensor units 3 are each in the form of an ABS sensor. This is shown as a driving movement query 4. A driving movement is detected by a numerical sensor value comparison, namely as soon as the sensor value of the respective incremental sensor units 3 changes between two consecutive time steps by more than a corresponding, definable threshold value. The threshold value for detecting a driving movement is defined before commissioning.

If the check regarding the detection of a driving movement of the motor vehicle ends positively, then the method is continued with the next step aimed at iteratively determining the radius of the wheel. Otherwise, the method is stopped or terminated—cf. "STOP" of the method. The movement of the motor vehicle is therefore a necessary condition for the applicability of the method.

Provided that a driving movement has been detected, in a next step the respective sensor values of the sensors 2a, 2b and 2c of the driving direction sensor unit 2 are fed to a straight line analysis 5. The result of the straight line analysis 5 is checked with regard to the detection of straight line travel. This is shown as a straight line travel query 6. Straight line travel is detected by a numerical sensor value comparison, namely when the sensor value of one of the sensors 2a, 2b or 2c changes between two consecutive time steps by up to a corresponding, defined threshold value. The threshold value for the detection of straight line travel is defined before commissioning.

If the check for the detection of straight line travel of the motor vehicle ends positively, the method is continued with the next step aimed at iteratively determining the radius of the wheel. Otherwise, the method is continued by means of a rejection 7 of new a posteriori individual radii for the current iteration. This means that the previous wheel radii are then used to carry out the subsequent iteration or repetition of the method.

Provided that straight line travel has been detected, the next step is to check the respective sensor values of the incremental sensor units 3 with regard to the detection of sliding and slipping conditions of the respective wheels 1. This is presented as a sliding and slipping query 8. A sliding and slipping state is detected by a numerical sensor value comparison, namely as soon as the sensor values of at least two of the incremental sensor units 3 deviate from each other by up to a corresponding, defined threshold value. The threshold value for detecting a sliding and slipping state is defined before commissioning.

If the check with regard to the detection of slide-free and slip-free straight line travel of the motor vehicle ends positively, the method is continued with the next step aimed at iterative determination of the radius of the wheel. Otherwise, the method will continue by means of rejecting 7 new a posteriori individual radii for the current iteration. The previous radii are then used to carry out the next iteration or repetition of the method.

Provided that slide-free and slip-free straight line travel has been detected, in a next step the distances driven by the individual wheels 1 are determined, namely by an a priori individual distance calculation 9. The distance driven by a single vehicle wheel 1 is calculated as a mathematical product of the sensor value of the respective incremental sensor unit 3, the resolution of the respective incremental sensor unit 3 and the respective a priori individual radius. The respective a priori individual radius is stored in an a priori individual radius cache 10.

Within the first iteration of the method, the a priori individual radii correspond to initially defined radius values which serve as the starting value. The starting values of the a priori individual radii are nominal or empirical values which are determined before commissioning.

In all other cases, that is within each subsequent iteration from the second iteration of the method, the following applies:

If in the immediately preceding iteration slide-free and slip-free straight line travel has been detected and the validation condition has been met and if no slide-free and slip-free straight ahead travel is detected in the current iteration, the a priori individual radii correspond to the a posteriori individual radii from the immediately preceding iteration or repetition.

If slide-free and slip-free straight line travel has been detected in the immediately preceding iteration and the validation condition has been met, and if slide-free and slip-free straight line travel is detected in the current iteration, but the validation condition is not met, the a priori individual radii correspond to the a priori individual radii from the immediately preceding iteration or repetition.

In a next step, the distance travelled by the motor vehicle is determined, namely by a total distance calculation 11. For this purpose, the arithmetic mean value of the four driven distances of the individual wheels 1 is calculated.

The term "a priori" refers to time periods or program sequences within an iteration or repetition before the total distance calculation 11. The term "a posteriori" refers to time periods or program sequences within an iteration or repetition after the total distance calculation 11.

Subsequently, an a posteriori individual radius calculation 12 determines the radii to be iteratively determined of the respective wheels 1 or the respective a posteriori individual radii. The respective a posteriori individual radius is calculated as a mathematical quotient of the distance driven by the motor vehicle and the sensor value of the corresponding incremental sensor unit 3 as well as the resolution of the corresponding incremental sensor unit 3. The respective a posteriori individual radii are stored in an a posteriori individual radius cache 13 at the runtime of the method.

During or at the same time as the a posteriori individual radius calculation 12, a previously defined validation condition 14 is used to check whether the radii determined are sufficiently reliable. The validation condition 14 includes two validation criteria 15, 16, wherein the validation condition 14 is met if both validation criteria 15, 16 are met.

The first validation criterion 15 is designed as a relaxation length query. It is met if the accumulated driven distance of the motor vehicle reaches or exceeds a specified relaxation length. The relaxation length is defined as a driven distance, namely as the distance driven which corresponds to the initially defined radius value serving as the starting value.

If the first validation criterion 15 is met, the method is continued with the checking of a second validation criterion 16.

The second validation criterion 16 is designed as an incremental number query. It is met when the accumulated number of increments detected by one of the incremental sensor units 3 reaches a specified number of increments.

If the second validation criterion 16 is met, i.e. if the validation condition 14 is met, then the method is continued by means of an approval 17.

If, on the other hand, the first validation criterion 15 or the second validation criterion 16 is not met, that is if the validation condition 14 is not met, the method is continued by rejecting 7 new radius values. The respective previous wheel radii are then used for the next iteration or repetition of the method. In other words, the wheel radii to be determined iteratively are not updated in such a case.

Provided that the validation condition 14 is met, the respective a posteriori individual radii stored in the a posteriori individual radius cache 13 are adopted as the radii of the respective wheels 1 determined in the current iteration for further use by the approval 17 of new radius values. For this purpose, the radius values stored in the a priori individual radius cache 10 are replaced by the radius values stored in the a posteriori individual radius cache 13 by means of an update 18. In this case, the values previously stored in the a priori individual radius cache 10 are transferred to rejection 7.

The a posteriori individual radii, which either correspond to the values of the immediately preceding iteration by means of the rejection 7 of new radius values or correspond to the values determined in the current iteration by means of the approval 17 of new radius values, result in a summary of results 19.

Finally, the aforementioned steps are iterated or repeated in a new iteration of the method, that is, they are carried out again as defined in the driving movement query 4.

Figure 2:
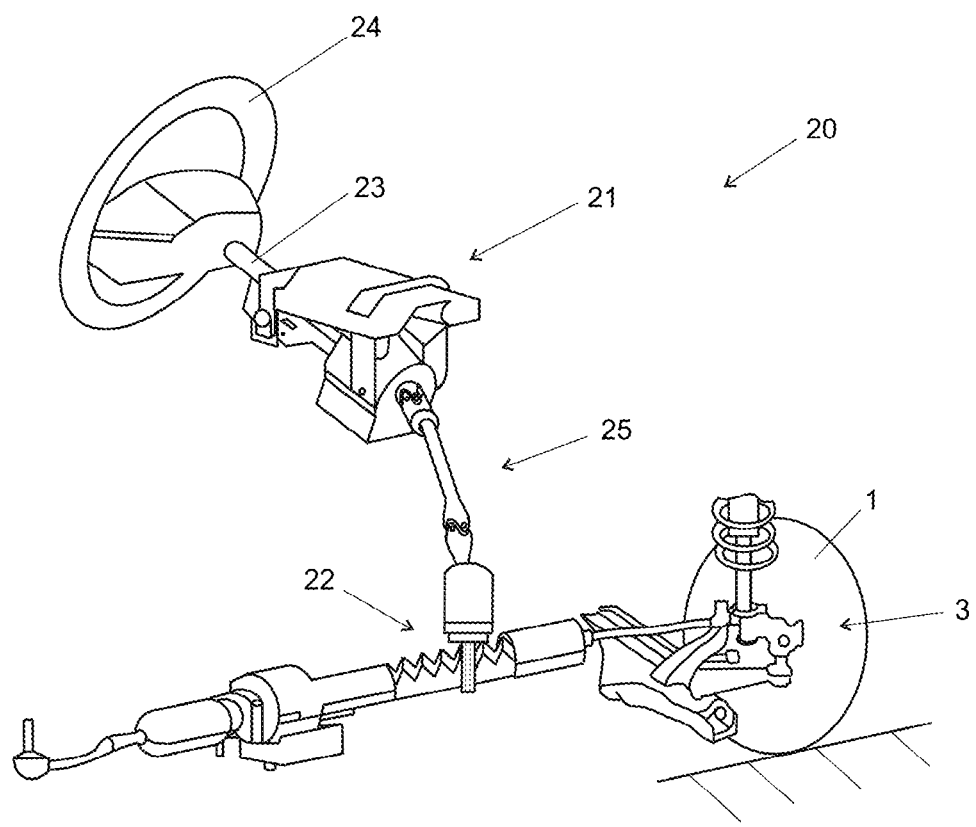
FIG. 2 is a schematic perspective view of an example steering system for a motor vehicle on the wheels of which the methods of the present disclosure can be applied.

FIG. 2 shows a steering system 20 for a motor vehicle, which is not shown in the figures, on the four wheels 1 of which the method from FIG. 1 can be applied.

The steering system 20 includes a steering column 21 and a steering gear 22. The steering column 21 includes a steering spindle 23, with a steering wheel 24 attached to the end thereof which faces the driver. The steering gear 22 is used to translate steering commands, which can be generated by the driver by turning the steering wheel 26, into corresponding rotations of the wheels 1 around their respective vertical axes. For the sake of a better overview, FIG. 2 only shows the wheel 1 which is arranged in the front left in the direction of travel of the vehicle. The structural and functional design of the wheel 1 which is arranged in the front right in the direction of travel of the vehicle corresponds to that of the wheel 1 which is arranged in the front left in the direction of travel of the vehicle in an analogous manner.

The steering column 21 and the steering gear 22 are mechanically connected by a steering shaft 25 arranged between the steering column 21 and the steering gear 22. Alternatively, the steering column 21 and the steering gear 22 may also be electrically or electronically connected by a data transmission device (not shown in the figures) arranged between the steering column 21 and the steering gear 22. The working connection of two components means that a movement is transferable from one component to the other component.

The wheel 1 is assigned an incremental sensor unit 3 in the form of an ABS sensor. The incremental sensor unit 3 is used to detect increments which embody wheel rotational movements. The incremental sensor unit 3 counts increments which move past the incremental sensor unit 3 during a wheel rotation or wheel rolling movement, that is which move away under the incremental sensor unit 3.

REFERENCE CHARACTER LIST

1 Vehicle wheel
1a First wheel
1b Second wheel
1c Third wheel
1d Fourth wheel
2 Driving direction sensor unit
2a Inertial sensor
2b Yaw rate sensor
2c Steering angle sensor
3 Incremental sensor unit
4 Driving movement query
5 Straight line travel analysis
6 Straight line travel query
7 Rejection (of the new a posteriori individual radii)
8 Slide and slip query
9 a priori individual distance calculation
10 a priori individual radius cache 11 Total distance calculation
12 a posteriori individual radius calculation
13 a posteriori individual radius cache
14 Validation condition
15 First validation criterion (relaxation length query)
16 Second validation criterion (increment count query)
17 Approval (of the new a posteriori individual radii)
18 Update (of the a priori individual radii based on the new a posteriori individual radii)
19 Summary of results
20 Steering system
21 Steering column
22 Steering gear
23 Steering spindle
24 Steering wheel
25 Steering shaft

What is claimed is:

1. A method for iteratively determining and using a radius of a wheel of a number of wheels of a motor vehicle, wherein the motor vehicle includes a driving direction sensor unit for detecting straight line travel, wherein each wheel of the number of wheels is assigned an incremental sensor unit for detecting increments embodying wheel rotational movements, the method comprising:
 (a) checking whether the motor vehicle is driving based on sensor values of at least one of the incremental sensor units;
 (b) when the motor vehicle is driving, checking whether the motor vehicle is driving in a straight line based on sensor values of the driving direction sensor unit;
 (c) when the motor vehicle is driving in a straight line, checking whether each wheel of the number of wheels is slide-free and slip-free based on sensor values of at least one of the incremental sensor units;
 (d) when the motor vehicle is driving in a straight line without sliding and slipping, determining a distance driven by each wheel of the number of wheels based on the sensor value of the respective incremental sensor unit and a radius to be iteratively determined of the wheel of one of previous iterations, wherein the radius to be iteratively determined of the wheel of one of the previous iterations during a first iteration corresponds to an initially determined value serving as a starting value;
 (e) determining a distance driven by the motor vehicle based on the distance driven by each wheel of the number of wheels,
 (f) determining the radius to be iteratively determined of the wheel based on the distance driven by the motor vehicle and the sensor value of the respective incremental sensor unit;
 (g) verifying that a validation condition is met;
 (h) upon verification that the validation condition is met, iterating the aforementioned steps, and
 (i) using the determined radius during automated parking or unparking of the motor vehicle, wherein the motor vehicle partially self-driving or partially self-driving.

2. The method of claim 1 comprising determining the motor vehicle to be driving based on the sensor value of one or all of the incremental sensor units changing by more than a corresponding, definable threshold value between two consecutive time steps.

3. The method of claim 1 comprising determining the motor vehicle to be driving in a straight line based on the sensor value of at least one driving direction sensor unit changing by less than a corresponding, definable threshold value between two consecutive time steps.

4. The method of claim 1 comprising determining that each wheel of the number of wheels is slide-free and slip free based on the sensor values of at least two of the incremental sensor units differing by less than a corresponding, definable threshold value.

5. The method of claim 1 comprising determining the distance driven by each wheel by multiplying the sensor value of the respective incremental sensor unit by a resolution of the respective incremental sensor unit and by the radius to be iteratively determined of the wheel.

6. The method of claim 1 comprising determining the distance driven by the motor vehicle by calculating an average value of the distance driven by all of the wheels.

7. The method of claim 1 comprising determining the radius to be iteratively determined by dividing the driven distance of the motor vehicle by the sensor value of the respective incremental sensor unit and by a resolution of the respective incremental sensor unit.

8. The method of claim 1 wherein the validation condition includes one or more validation criteria, wherein the validation condition is met if all validation criteria are met.

9. The method of claim 8 wherein each validation criterion is met upon:
 achievement of a definable relaxation length, wherein the relaxation length is defined as a driven distance; and/or
 achievement of a definable driven distance of the wheel, a definable driven distance of the motor vehicle, or a definable number of recorded increments of at least one of the at least one incremental sensor unit.

* * * * *